United States Patent
Dehennau et al.

(10) Patent No.: US 8,696,853 B2
(45) Date of Patent: *Apr. 15, 2014

(54) PROCESS FOR MANUFACTURING A PLASTIC-BASED CELLULAR STRUCTURE AND DEVICE FOR IMPLEMENTING THIS PROCESS

(75) Inventors: Claude Dehennau, Waterloo (BE); Dominique Grandjean, Brussels (BE); Paul Henrard, Le Roux (BE)

(73) Assignee: Solvay SA, Brussels (BE)

( * ) Notice: Subject to any disclaimer, the term of this patent is extended or adjusted under 35 U.S.C. 154(b) by 1059 days.

This patent is subject to a terminal disclaimer.

(21) Appl. No.: 12/063,148

(22) PCT Filed: Aug. 17, 2006

(86) PCT No.: PCT/EP2006/065385
§ 371 (c)(1),
(2), (4) Date: Sep. 10, 2010

(87) PCT Pub. No.: WO2007/020279
PCT Pub. Date: Feb. 22, 2007

(65) Prior Publication Data
US 2011/0012281 A1    Jan. 20, 2011

(51) Int. Cl.
*B29C 44/16* (2006.01)
*B29C 44/58* (2006.01)

(52) U.S. Cl.
USPC ........................................ 156/244.11; 264/50

(58) Field of Classification Search
USPC ................................................... 156/244.11
See application file for complete search history.

(56) References Cited

U.S. PATENT DOCUMENTS 3,557,271 A    1/1971    Fairbanks
3,624,250 A    11/1971   Carlson
(Continued)

FOREIGN PATENT DOCUMENTS

DE    1779330 A1    9/1971
DE    3225764 A1    1/1984
(Continued)

OTHER PUBLICATIONS

PCT International Search Report dated Nov. 6, 2006 for International Application No. PCT/EP2006/065385 (3 p.).
(Continued)

*Primary Examiner* — Philip Tucker
*Assistant Examiner* — Vicki Wu
(74) *Attorney, Agent, or Firm* — Oblon, Spivak, McClelland, Maier & Neustadt, L.L.P.

(57) ABSTRACT

A process for manufacturing a plastic-based cellular structure, in which parallel lamellae are continuously extruded through a die having a plurality of parallel slots and upon exiting the die spaces lying between two adjacent lamellae are subjected, in successive alternations and between two sizing units whose length is short enough for the plastic composition to remain molten, to an injection of compressed gas and to a vacuum, the two sides of a given lamella being, in respect of one of them, subjected to the action of the compressed gas and, in respect of the other of them, subjected to the action of the vacuum, and vice versa during the next alternation, so as to deform the lamellae and weld them together in pairs, with formation, in a plane approximately parallel to the extrusion direction, of a cellular structure whose constituent cells extend perpendicular to the extrusion direction.

7 Claims, 3 Drawing Sheets

(56) References Cited

U.S. PATENT DOCUMENTS

Figure 1:
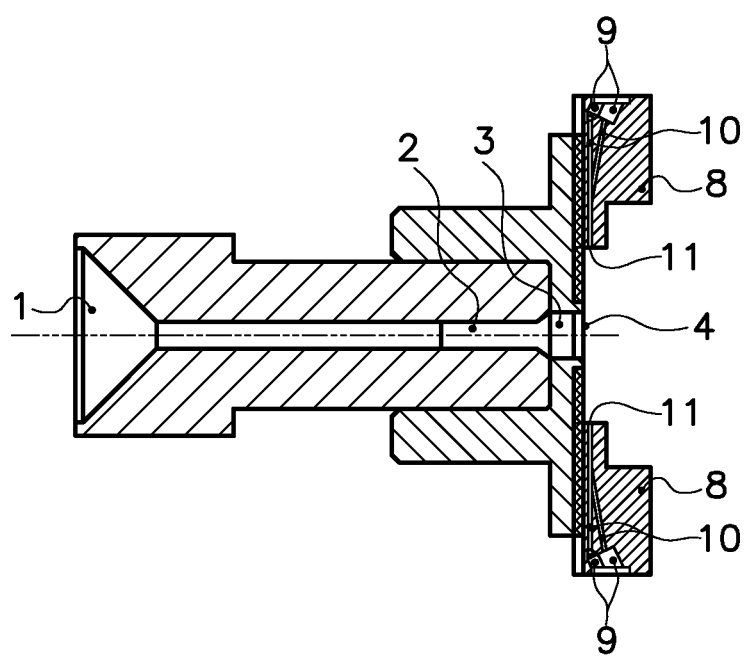

| | | | |
|---|---|---|---|
| 4,371,326 A | 2/1983 | McAlister | |
| 4,513,129 A | 4/1985 | Nakagawa et al. | |
| 4,524,194 A | 6/1985 | Dumoulin | |
| 4,739,024 A | 4/1988 | Moggi et al. | |
| 5,066,536 A * | 11/1991 | Cogswell et al. | 428/216 |
| 5,922,438 A * | 7/1999 | Scharkowski | 428/116 |
| 6,277,231 B1 * | 8/2001 | Ducruy | 156/244.15 |
| 8,110,137 B2 * | 2/2012 | Dehennau et al. | 264/514 |
| 2002/0161096 A1 * | 10/2002 | Loontjens et al. | 524/445 |
| 2005/0272853 A1 | 12/2005 | El-Hibri | |
| 2006/0219354 A1 | 10/2006 | Dehennau | |

FOREIGN PATENT DOCUMENTS

| | | | |
|---|---|---|---|
| DE | 3909189 A1 | | 11/1989 |
| EP | 1009625 A1 | | 6/2000 |
| EP | 1228977 A1 | * | 8/2002 |
| FR | 2857616 A1 | | 1/2005 |
| WO | WO 8700119 A1 | * | 1/1987 |

OTHER PUBLICATIONS

PCT International Preliminary Report on Patentability dated Feb. 20, 2008 including the Written Opinion from ISA for International Application No. PCT/EP2006/065385 (7 p.).

Preliminary Search Report from Institut National de la Propriete Industrielle dated Jun. 7, 2006 for counterpart French Application No. 05.08635 (2 p.).

Preliminary Search Report from Institut National de la Propriete Industrielle dated Oct. 24, 2006 for counterpart French Application No. 06.01942 (3 p.).

* cited by examiner

PROCESS FOR MANUFACTURING A PLASTIC-BASED CELLULAR STRUCTURE AND DEVICE FOR IMPLEMENTING THIS PROCESS

CROSS-REFERENCE TO RELATED APPLICATIONS

This application claims priority to French Application No. 05.08635, filed Aug. 19, 2005, French Application No. 05.09832, filed Sep. 26, 2005, French Application No. 06.01942, filed Mar. 3, 2006 and Belgian Application No. 2006/0140 filed Mar. 3, 2006, the entirety of which is incorporated herein by reference.

The present invention relates to a process for manufacturing a cellular structure based on a plastic, in particular based on polyarylethersulphone. It also relates to a device for implementing this process.

A requirement encountered in many (aeronautical, automotive, civil engineering, naval, etc.) industries consists in optimizing the mechanical properties/weight ratio of the structures used. Many processes have been developed for achieving this objective, and in particular for lightening plastic structures. Most of these processes use either the mechanical formation of macroscopic cells (by assembly of solid or molten streams in order to form cellular structures referred to as "honeycomb" structures) or the physical formation of microscopic cells by the generation or expansion of a gas (expansion or foaming using physical or chemical blowing agents). A combination of the two types of process has also been envisaged.

Document DE-A-1 779 330 describes a process and an injection head for continuous manufacture of cellular products made of mouldable materials by vertical extrusion of sections through several separate stationary nozzles placed side by side and terminating in a blowing chamber. The sections are deflected transversely to the extrusion direction by the action of pressure means, which may especially be a vapour, a liquid or a gas, particularly hot compressed air, and are welded together. The use of a hot fluid is necessary in order to prevent the die from cooling and, if so doing, causing the material to solidify and the die to be blocked.

This process is specific to small-sized structures (small mesh netting) but is not suitable for the manufacture of large-sized cellular structures of the "honeycomb" type. This is because such structures would collapse under their own weight. Furthermore, even for small structures (netting), this process leads to deformation of the mesh cells as a result of the hydrostatic thrust of the molten material upstream of the blowing chamber.

A process for manufacturing large cellular structures by continuous extrusion has been proposed in document EP-B-1 009 625, the content of which is incorporated for reference in the present description. This process consists in:
continuously extruding, using a multi-slot die, parallel sheets of a thermoplastic into a cooling chamber, with sealing being provided between the longitudinal edges of the sheets and the walls of the chamber, the various sheets defining, between them and with the walls of the chamber, compartments;
creating, in this chamber and from the end located on the side facing the die, a vacuum in each pair or unpair compartment, so as to deform and attract, in pairs, the extruded sheets in order to produce local welding over their entire height;
filling, from the end located on the same side as the die, every unpair or pair compartment, alternating with the previous compartments, using a cooling fluid, which is water; and alternating, in each compartment, the vacuum and filling with a cooling fluid, in order to obtain a solidified cellular structure in the cooling chamber, in which the cells are perpendicular to the extrusion direction.

According to this process, the cellular structures obtained are solid upon leaving the cooling chamber. This is because the use of water in the sealed cooling chamber has the consequence that this fluid remains in the cell that it has, in a very short time, inflated, welded to the neighbouring cell and solidified. Thus, rapid solidification is essential to the feasibility of the process as, otherwise, the cellular structure would adhere to the walls of the long (tubular) cooling chamber and therefore entail high pressure drops.

Moreover, the geometry of the die used and the methods of implementing this process (and especially the use of water as cooling fluid) are such that only very fluid resins, that is to say resins for injection moulding and therefore not for thermoforming, can be used (typically having a melt flow index (MFI) of more than 10 dg/min) Furthermore, firstly the temperature of the material at the die entry must be very high so as to reduce the viscosity of the resin as much as possible, in order to increase the welding rate, and secondly resins having a high glass transition temperature or a high melting point cannot be welded by this technique as they cool too rapidly before a weld can be produced. Since certain resins, such as for example polyvinyl chloride (PVC), have a low thermal stability, they cannot be heated to the desired temperature. Furthermore, certain compositions are, and generally remain, relatively viscous, even at high temperature. As a result, the intermittent welding of the adjacent sheets is not carried out correctly. In addition, since the viscous material rapidly solidifies on contact with the water present in the cooling chamber, the sheets are drawn only a little at the die exit and therefore the cellular structure obtained often has a high bulk density (expressed in kg per $dm^3$ of structure). This process is therefore limited in terms of thickness of the extruded lamellae, since if they are too thin they solidify before being welded.

The object of the present invention is to solve these problems and in particular to obtain plastic-based cellular structures that are lightweight and have good-quality welds, this being so over a wide range of viscosities and temperatures. It is based on the surprising observation that "honeycomb" cellular structures may be extruded continuously in a horizontal manner without the use of a cooling fluid, and in particular without the use of water. This is because, provided that the die is, at least on the surface, thermally insulated and is sufficiently short for the plastic to still be in the molten or pasty state at the die exit, it is possible to use a gas at a temperature below the processing temperature of the plastic in order to produce the cells, and to do so without causing bonding of the structure upon exiting the die. The process thus becomes less expensive than the process using water thanks to the fact that, on the one hand, the forces involved with the formulation and the cost associated with certain additives can be avoided and, on the other hand, the die can be simplified, as it no longer has to withstand pressurized water therewithin.

The present invention therefore relates, primarily, to a process for manufacturing a plastic-based cellular structure, in which:
parallel lamellae of a composition based on at least one plastic are continuously extruded, in an approximately horizontal direction, through a die having a front face provided with a plurality of parallel slots and with an insulating material, at least on the surface; and upon exiting the die, the spaces lying between two adjacent lamellae are subjected, in successive alternations and between two sizing units whose length is short enough for the plastic composition to remain molten, to an injection of compressed gas and to a vacuum, the two sides of a given lamella being, in respect of one of them, subjected to the action of the compressed gas and, in respect of the other of them, subjected to the action of the vacuum, and vice versa during the next alternation, so as to deform the lamellae and weld them together in pairs, with formation, in a plane approximately parallel to the extrusion direction, of a cellular structure whose constituent cells extend perpendicular to the extrusion direction.

In the present description, the term "plastic" is understood to mean any thermoplastic polymer, including thermoplastic elastomers, and also blends thereof. The term "polymer" denotes both homopolymers and copolymers (especially binary or ternary copolymers). Examples of such copolymers are, non-limitingly: random copolymers, linear block copolymers, other block copolymers and graft copolymers.

Any type of thermoplastic polymer or copolymer whose melting point, if the (co)polymer is semicrystalline, or whose glass transition temperature, if the (co)polymer is amorphous, is below the decomposition temperature is suitable. Among synthetic thermoplastics that are particularly suitable, mention may be made of semicrystalline thermoplastics that have a melting range spread over at least 10° C. Examples of such materials include those that exhibit polydispersion in their molecular weight.

The following may especially be used: polyolefins; polyvinyl halides (for example PVC) or polyvinylidene halides; thermoplastic polyesters; thermoplastic fluoropolymers; polyarylethersulphones such as polyphenylsulphones (PPSU); polyketones, polyamides (PA) and copolymers thereof. Polyolefins [and in particular polypropylene (PP) and polyethylene (PE)], polyarylethersulphones, such as polyphenylsulphones (PPSU), PAs, PVCs and thermoplastic fluoropolymers have given good results.

For the purposes of the present invention, a polyarylethersulphone denotes any polymer in which at least 5% by weight of the repeat units are repeat units (R) that satisfy one or more formulae comprising at least one arylene group, at least one ether group (—O—) and at least one sulphone group [—S($=O)_2$—].

The polyarylethersulphone may especially be a polybiphenylethersulphone, a polysulphone, a polyethersulphone, a polyimidoethersulphone, or else a blend composed of polyarylethersulphones chosen from the aforementioned polyarylethersulphones.

Examples of such polymers that are very suitable for the purpose of the invention are:

RADEL® R polyphenylsulphones from Solvay Advanced Polymers, L.L.C., which are examples of PPSU homopolymers;

polysulphone homopolymers sold by Solvay Advanced Polymers, L.L.C. under the brand name UDEL®; and polyethersulphones sold by Solvay Advanced Polymers, L.L.C. under the name RADEL® A.

For the purpose of the present invention, "fluoropolymer" is intended to denote any polymer comprising recurring units (R), more than 25% wt of said recurring units (R) being derived from at least one ethylenically unsaturated monomer comprising at least one fluorine atom (hereinafter, fluorinated monomer).

The fluoropolymer comprises preferably more than 30% wt, more preferably more than 40% wt of recurring units derived from the fluorinated monomer.

The fluorinated monomer can further comprise one or more other halogen atoms (Cl, Br, I). Shall the fluorinated monomer be free of hydrogen atom, it is designated as per(halo)fluoromonomer. Shall the fluorinated monomer comprise at least one hydrogen atom, it is designated as hydrogen-containing fluorinated monomer.

In a first embodiment of the invention, the polymer (F) is a hydrogen-containing fluoropolymer.

By "hydrogen-containing fluoropolymer" it is meant a fluoropolymer as above defined comprising recurring units derived from at least one hydrogen-containing monomer. Said hydrogen-containing monomer may be the same monomer as the fluorinated monomer or can be a different monomer.

Thus, this definition encompasses notably copolymers of one or more per(halo)fluoromonomer (for instance tetrafluoroethylene, chlorotrifluoroethylene, hexafluoropropylene, perfluoroalkylvinylethers, etc.) with one or more hydrogenated comonomer(s) (for instance ethylene, propylene, vinylethers, acrylic monomers, etc.), and/or homopolymers of hydrogen-containing fluorinated monomers (for instance vinylidene fluoride, trifluoroethylene, vinyl fluoride, etc.) and their copolymers with fluorinated and/or hydrogenated comonomers.

The hydrogen-containing fluoropolymer are preferably chosen among:

(F-1) TFE and/or CTFE copolymers with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.1 to 30% by moles, based on the total amount of TFE and/or CTFE and hydrogenated comonomer(s) (see for instance U.S. Pat. No. 3,624,250 and U.S. Pat. No. 4,513,129);

(F-2) Vinylidene fluoride (VdF) polymers, optionally comprising reduced amounts, generally comprised between 0.1 and 15% by moles, of one or more fluorinated comonomer(s) (see for instance U.S. Pat. No. 4,524,194 and U.S. Pat. No. 4,739,024), and optionally further comprising one or more hydrogenated comonomer(s); and and mixtures thereof.

According to a second embodiment of the invention, the polymer (F) is a per(halo)fluoropolymer.

For the purpose of the invention, the term "per(halo)fluoropolymer" is intended to denote a fluoropolymer substantially free of hydrogen atoms.

The term "substantially free of hydrogen atom" is understood to mean that the per(halo)fluoropolymer consists essentially of recurring units derived from ethylenically unsaturated monomers comprising at least one fluorine atom and free of hydrogen atoms (per(halo)fluoromonomer).

The per(halo)fluoropolymer can comprise recurring units comprising one or more other halogen atoms (Cl, Br, I).

The per(halo)fluoropolymer can be a homopolymer of a per(halo)fluoromonomer or a copolymer comprising recurring units derived from more than one per(halo)fluoromonomers.

Preferred per(halo)fluoropolymers are selected among TFE copolymers comprising recurring units derived from at least one fluorinated comonomer.

Good results have been obtained with TFE copolymers wherein the fluorinated comonomer is one or more than one perfluoroalkylvinylether as above specified; particularly good results have been achieved with TFE copolymers wherein the fluorinated comonomer is perfluoromethylvinylether (of formula $CF_2=CFOCF_3$), perfluoroethylvinylether (of formula $CF_2=CFOC_2F_5$), perfluoropropylvinylether (of formula $CF_2=CFOC_3F_7$) and mixtures thereof.

Best results have been obtained with TFE copolymers wherein the fluorinated comonomer is perfluoromethylvinylether, a mixture of perfluoromethylvinylether and perfluoropropylvinylether, a mixture of perfluoroethylvinylether and perfluoropropylvinylether, or perfluoropropylvinylether.

MFA copolymers (TFE copolymers comprising recurring units derived from perfluoromethylvinylether) and PFA copolymers (TFE copolymers comprising recurring units derived from perfluoropropylvinylether) suitable to be used for the composition of the invention are commercially available from Solvay Solexis S.pA. under the trade name of HYFLON® PFA and MFA.

Finally, it is also possible to use, for the purpose of the invention, crosslinkable thermoplastic resins, such as silane-grafted PEs, TPVs and TPEs, but also natural and synthetic rubbers that can be formed using the extrusion process and subsequently hot-vulcanized by passing them through an oven or by microwaves.

The process according to the present invention advantageously applies to compositions based on at least one plastic (hereafter called more simply "compositions"), the constituent polymer(s) of which has (have) a melt viscosity (measured according to ISO 6721-10 (1999) at the processing temperature and at 0.1 rad/s) of at least 2500 Pa·s, preferably at least 3000 Pa·s, or even at least 4000 Pa·s. Advantageously, it also applies to compositions whose constituent polymer(s), if amorphous, has (have) a glass transition temperature ($T_g$) greater than or equal to 0° C., preferably greater than 40° C. and in particular greater than or equal to 80° C., and, if semicrystalline, has/have a melting point greater than or equal to 50° C., preferably 100° C. and in particular greater than or equal to 180° C. The composition used in the process according to the invention may consist of a polymer, of a blend of polymers or copolymers, or of a compound of polymeric material(s) with various additives (stabilizers, plasticizers, inorganic, organic and/or natural or polymeric fillers, etc.). Nanofillers are particularly suitable as they allow the melt rheology of the composition to be favourably modified, and therefore favour its aptitude for the manufacture of honeycomb structures by the process according to the invention.

This composition may have undergone various treatments, such as expansion, orientation, etc.

The process according to the invention gives good results with plastic compositions that include a blowing agent for producing expanded or foamed cellular structures. This is because the fact of using a compressed gas instead of water, as fluid, allows the use of viscous resins, and consequently the lesser cooling makes it possible to improve the drawing of the cells of the foam, thereby improving its texture.

The blowing agent according to this variant of the present invention may be of any known type. It may be a "physical" blowing agent, that is to say a gas dissolved under pressure in the plastic and causing the plastic to expand as its leaves the extrusion device. Examples of such gases are $CO_2$, nitrogen, water vapour, hydrofluorocarbons or HFCs (such as the mixture of $CF_3CH_2F/CHF_2CH_3$ at 87/13% by weight sold by Solvay under the trademark SOLKANE® XG87), hydrocarbons (such as butane and pentane) or a mixture thereof. It may also be what is called a "chemical" blowing agent, that is to say a substance (or a mixture of substances) dissolved or dispersed in the plastic, and which, under the effect of the temperature, releases the gas or gases that will be used for the expansion of the plastic. Examples of such substances are azodicarbonamide and sodium bicarbonate/citric acid mixtures. The latter give good results.

The amount of blowing agent used in the process according to this variant of the invention must be optimized, especially according to its nature, to the properties (especially viscosity) of the composition and to the desired final density. In general this content is not less than 0.1%, preferably not less than 0.5%, and even not less than 1%.

The execution of the process according to the invention involves the continuous extrusion of parallel lamellae of the composition, in an approximately horizontal direction, through a die having a front face provided with a plurality of parallel slots and with an insulating material, at least on the surface. To do this, an extrusion device is used which constitutes another aspect of the invention, described in detail below, and which essentially comprises:

(a) a flat die, preferably with an enlarged opening, which feeds the molten composition to knives, for forming the lamellae of molten composition that have to be welded. This die is placed in such a way that the molten composition is extruded in an approximately horizontal direction. The expression "approximately horizontal direction" is understood according to the present description to mean a direction that does not deviate by more than 15°, preferably no more than 10°, from the horizontal; it is particularly preferable for the longitudinal axis of the die to lie in a horizontal plane; and (b) a plurality of knives, which make it possible to form the lamellae of molten composition that have to be welded. These knives, of which there are at least two, and the number of which may be up to ten, or twenty or even more, may consist of any materials resistant to the processing temperature of the molten composition. They may be made of a thermally conducting material, such as steel, copper or metal alloys, or made of a thermally insulating material, such as ceramics or polyimide resins optionally reinforced with glass fibres, or any other material of satisfactory mechanical strength and thermal resistance. Since the front face of the die according to the invention consists in fact of the abovementioned set of knives (which may be machined from a single block or may consist of an assembly of blades), they necessarily have to be made entirely of a thermally insulating material, or must have their downstream end based on or embedded in a thermally insulating material. The term "downstream end" of the knives is understood to mean their external face, that is to say the one facing the sizing units.

According to a preferred variant of the invention, the knives are made of a thermally conducting material and are extended at their downstream end by lips that are also made of a thermally conducting material and are intended to be embedded in an insulating coating and to be flush with the front face of the die. By proceeding in this way it is possible to prevent the molten plastic from interfering between the insulating coating and the conducting knife A preferred thermally conducting material for manufacturing the knives is the metal alloy consisting of 64% iron and 36% nickel, known by the brand name INVAR. A preferred thermally insulating material for manufacturing the knives is formed by the group of polyimide resins reinforced with glass fibres.

These knives are generally in parallel vertical planes, preferably approximately equidistant apart. Between them they define flow channels having, in the flow direction of the molten composition, a convergent first part and, thereafter, a substantially straight part, the latter forming the side walls of each constituent slot of the die. The geometry of this straight part of the flow channel is such that the ratio of its length to its mean thickness is not less than 2, preferably not less than 6, or even not less than 8. In practice, the mean thickness of the straight part of the flow channel is between 0.1 and 1 mm, preferably between 0.3 and 0.8 mm.

If the knives are made of a thermally conducting material and bear and/or are embedded in an insulating coating at their downstream end (the front face of the die), the thickness of said coating is generally at least equal to about 0.5 mm, preferably at least equal to about 1 mm and particularly preferably equal to about 2 mm. This coating is generally applied to the knives once they have been assembled.

The presence of an insulating material on the front surface of the die, through which the parallel lamellae of the molten composition are extruded (via the slots defined by the knives), is essential for the correct operation of the process according to the invention. This is because without this insulating material being present, the front face of the die would be cooled by the gas used to form the cells, thereby causing rigidification of the composition that accompanies a premature solidification of the molten material as it exits the slots of the die, making it impossible for subsequent formation of the cellular structure.

The extrusion device according to the invention also includes:

(c) two short sizing units (by "short" it is meant that their length is suitable for the plastic composition to always be in the molten or pasty state—depending on whether it is a semicrystalline or amorphous plastic, respectively). Should the composition solidify, the structure would stick to the sizing units. Preferably, the ratio of the length of the sizing units, measured parallel to the flow direction of the molten composition, to the height of the flow channel (i.e. the height of the die slots, which corresponds to the height of the cells forming the honeycomb) is preferably at most equal to 3, preferably at most equal to 2 or at most equal to 1. For practical reasons, this ratio is generally not less than 0.5.

These sizing units generally take the form of metal blocks that are placed on the front face of the die having the slots. These sizing units are placed on either side of the die slots, one above them and the other below them. They can generally be moved vertically, in opposite directions, in order to define the height of the extruded lamellae and consequently the height of the final cellular structure of the honeycomb. These short sizing units are generally not cooled, but their temperature may be regulated to a predetermined value, for example by oil circulation. In addition, from the way in which the sizing units are placed, they provide at the very most partial sealing with the upper and lower surfaces of the final cellular structure. The term "partial sealing" is understood to mean a clearance such that air under pressure, used to form a cell, can partially escape between the cellular structure produced and the two longitudinal walls of the sizing unit.

Two chambers are cut out in each of these sizing units, from which chambers there start tubular ducts that terminate in orifices of any, but preferably circular, cross section, emerging near the spaces lying between the slots of the die and therefore, during implementation of the process according to the invention, near the spaces lying between the extruded lamellae. In general, the distance of the orifices of the tubular ducts from the front face of the die is generally not less than about 0.5 mm, or even 1 mm, but preferably at most about 4 mm, particularly preferably at most about 3 mm.

Each chamber of each of these sizing units is connected alternately to a vacuum pump and to a compressed gas circuit. Thus, the spaces lying between two adjacent extruded lamellae are subjected, in successive alternations, to an injection of compressed gas and to a vacuum, the two sides of any one lamella being, in respect of one of them, subjected to the action of the compressed gas and, in respect of the other of them, subjected to the action of the vacuum, and vice versa during the next alternation, so as to deform the lamellae and weld them together in pairs, with formation, in a plane approximately parallel to the extrusion direction, of a cellular structure whose constituent cells extend perpendicular to the extrusion direction.

Each sizing unit is preferably set at a temperature at most 150° C. below $T_{struct}$, preferably at most 75° C. below $T_{struct}$ or even at most 25° C. below $T_{struct}$, where $T_{struct}$ is a structural temperature that corresponds to the glass transition temperature ($T_g$) if the composition comprises an amorphous polymer and to the melting point if the composition comprises a semicrystalline polymer. The temperature of the sizing units is preferably above the temperature at which the atmospheric air encountered during implementation condenses.

Finally, so as to minimize the friction of the molten plastic at the surface of the sizing units, this surface advantageously is provided with a slip-promoting coating (for example based on PTFE or a silicone).

The compressed gas used in the process according to the invention may be air, an inert gas or a mixture of inert gases not liable to impair the thermal stability of the composition. It is preferably air. This gas may be heated. In this case, the temperature of the gas is preferably at most 100° C. below the processing temperature ($T_{proc}$) of the plastic, more preferably at most 50° C. below $T_{proc}$ or even at most 20° C. below $T_{proc}$. In all cases, this temperature is below $T_{proc}$.

The welding of the lamellae is usually carried out immediately after they leave the die slots, that is to say as soon as possible in the sizing units.

On leaving the sizing unit, the cellular structure is preferably cooled by any known means, generally using a cooling fluid. Thus, the structure may be simply cooled by the ambient air, by blowing a jet of cold air, or by spraying a mist of water, etc. A jet of cold air gives good results. This operation allows the cellular structure to be stiffened, without solidifying it, by a slight reduction in the temperature. To do this, the extrusion device according to the invention preferably also includes:

(d) means for blowing cold air (by this it is meant in fact air at a temperature close to the ambient temperature, e.g. typically between 10 and 30° C., or even 15 and 25° C.; this air is "cold" compared with the molten plastic that it has to solidify; it is preferably not too cold in order to prevent condensation problems), which means are generally placed directly at the exit of the sizing unit and are designed for example so as to send sheets or jets of air onto the upper and lower faces of the cellular structure obtained, generally at an angle of less than 90°, preferably less than 60° and most particularly less than 45°.

Once the structure has been formed, it may prove to be beneficial, before or after the structure has solidified, to make the thickness thereof uniform (i.e. to make the height of the cells constant) using any suitable device such as, for example, rolls.

Advantageously, the cellular structure obtained is then taken up by a take-off unit. The take-off speed and the extrusion rate will be optimized, in particular according to the size and the thickness of the cells, and also the desired shape.

On leaving the take-off unit, the cellular structure may be subjected to a surface treatment (for example a corona treatment), so as in particular to improve the adhesion properties thereof, and to be lined with a nonwoven or with top and bottom facings. After these optional operations, the final panel is cut, both lengthwise and transversely, into sheets of the desired dimensions and stored.

The production scrap may be taken up either before the finishing operations, or afterwards, and recycled back into production.

The extrusion conditions of the process according to the present invention are tailored in particular to the nature of the plastic-based composition. As mentioned previously, the temperature of this composition at the die exit must be adapted so as to be able to achieve the welding of the cells, the expansion of the composition, where appropriate, etc., in the absence of any deformation due to gravity. The alternating pressure and vacuum values must also be adapted, as must the duration of the cycles, so as to optimize this welding. In practice, it is preferred to use a pressure of not less than 0.5 bar relative, or even 1.5 bar relative. In general, this pressure does not exceed 6 bar, or even 4 bar, and even more so does not exceed 2 bar. As regards the vacuum, this is generally at least 100 mmHg absolute, or even 400 mmHg absolute. Finally, the duration of the cycles (pressure/vacuum alternations) is generally 0.3 s or longer, or even 0.4 s or longer and preferably 0.5 s or longer. Preferably this duration does not exceed 3 s, or even 2 s, and even more so 1 s.

One particular embodiment of the extrusion device according to the invention will now be illustrated with reference to the drawings accompanying the present description. These drawings consist of the appended FIGS. 1 to 3, which show schematically a typical embodiment of this device.

FIG. 1 is a cross section in the vertical mid-plane of the overall extrusion device.

Figure 2:
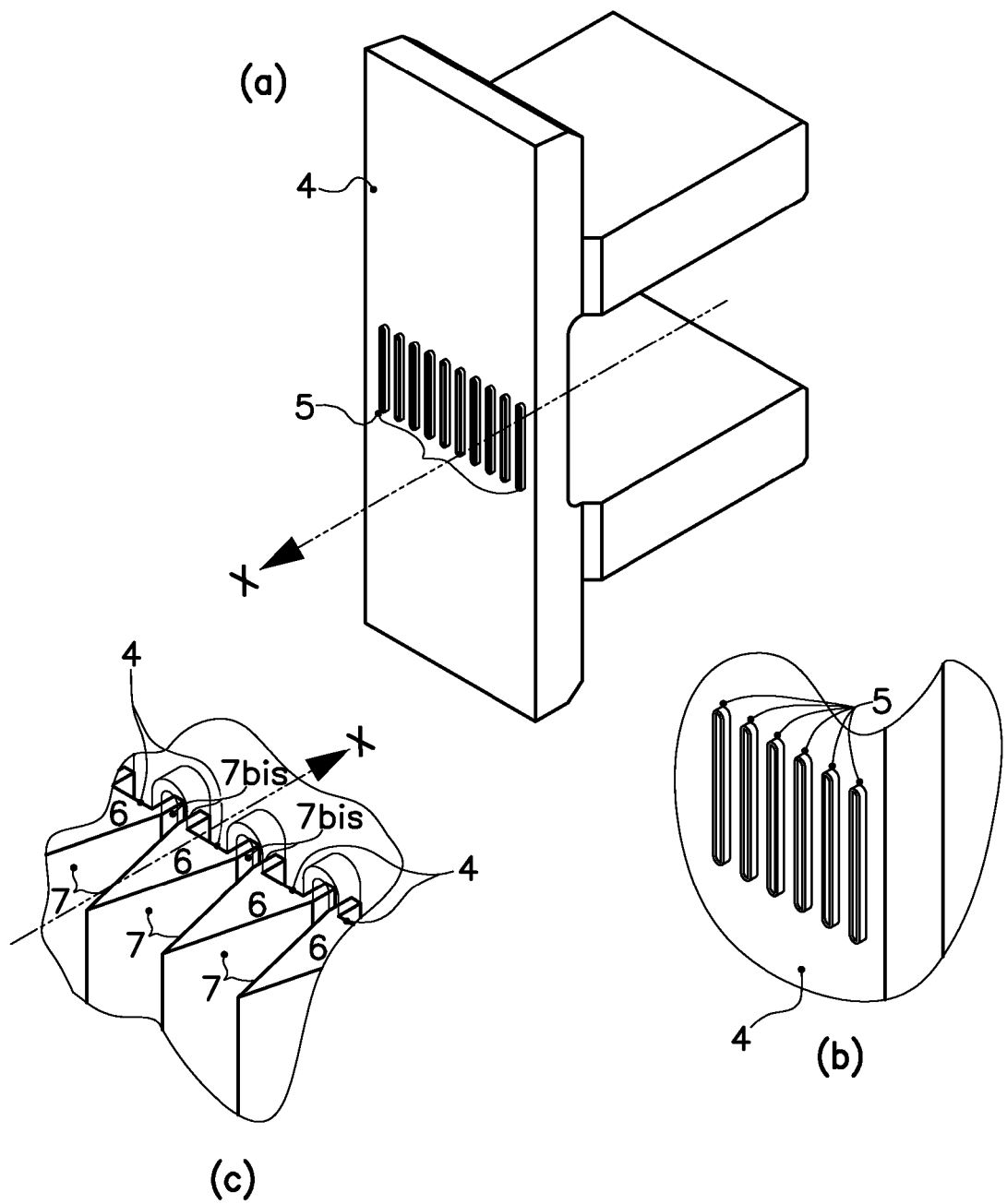

FIGS. 2($a$), 2($b$) and 2($c$) are, respectively, a view of the front face of the die (its coating with a sheet of insulating material not having been shown) and of the parallel slots with which it is equipped [2($a$)], an enlarged view of these slots [2($b$)] and an enlarged view, but not to scale, of part of the knives that between them define the flow channels, the straight part of which forms the side walls of each constituent slot of the die [2($c$)].

Figure 3:
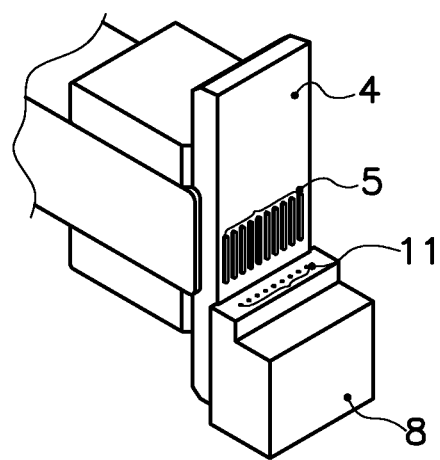

FIG. 3 is a partial view of the front of the extrusion device, which this time includes its insulating coating, and of its two sizing units, only the lower one has been shown.

In the particular embodiment of the extrusion device shown in the figures, the plastic-based composition intended to be extruded, in order to form the cellular structure, feeds the flat die, via the die entry cone 1 and the feed channel, with molten composition 2 towards the enlarged opening 3. The molten composition passes (along the extrusion direction represented by the axis X) through the slots 5 made on the front face 4 of the die via the metal knives 6 defining the flow channels 7, which are extended by metal lips (see FIG. 2) which have a straight part 7$a$ and are intended to be embedded in the insulating coating (see FIG. 3).

The two sizing units 8 placed on the front face 4 of the die have two chambers 9 from which there start tubular ducts 10 that terminate in circular orifices 11 emerging near the insulating coating. As mentioned above, each chamber 9 is alternately connected to a vacuum pump and to a compressed gas circuit (these not being shown) in order to subject, in successive alternations, the spaces lying between two adjacent extruded lamellae to an injection of compressed gas and to a vacuum, the two sides of any given lamella being, in respect of one of them, subjected to the action of the compressed gas and, in respect of the other of them, to the action of the vacuum, and vice versa during the next alternation, so as to deform the lamellae and weld them together in pairs, with formation of the cellular structure.

In the process according to the invention, the shape and the size of the cells may be adapted by modifying the melt viscosity of the polymer, the extrusion speed, the duration of the pressure/vacuum cycles, etc.

The shape of the cells of this structure may be approximately circular, elliptical (when the extrusion and/or haul-off speeds are higher), polygonal (when the applied pressure differences are more sudden), etc.

These cells generally have a length L (in the extrusion direction) that is greater than their width l (in the extrusion plane but in a direction perpendicular to the extrusion direction). In general, the aspect ratio (L/l) of the cells is therefore greater than 1, or even greater than 1.5, but generally less than 2.

The length (L) of the cells is generally at least 4 mm, or even at least 10 mm, but generally it does not exceed 30 mm, or even 20 mm. The width (l) itself is generally at least 2 mm, or even at least 5 mm, but it generally does not exceed 15 mm, or even 10 mm.

As regards the wall thickness of the cells, this is determined by the thickness of the slots through which the molten plastic lamellae are extruded and by the draw ratio imposed on the molten lamellae. In practice, the thickness is generally at least 100 µm, or even at least 200 µm or at least 250 µm. However, advantageously it does not exceed 1 mm, or even 0.8 mm and preferably does not exceed 0.6 mm for fear of making the structure too heavy. The lower limit depends in fact on the embodiment of the die. If this is a one-piece die in which the slots have been machined (for example by electrical discharge machining or by means of a laser beam), it will in general be necessary for the slots to be wider than if said die were to consist of an assembly of lamellae.

The size of the cellular structures obtained by the process according to the invention is limited by the size of the processing equipment. The term "size" is understood in fact to mean only the width and the height (measured perpendicular to the extrusion plane) and not the length, since the latter is determined by the duration of the extrusion and the frequency with which the extruded sheet is cut. The height of these structures is generally at least 1 mm, or even 2 mm, and preferably 5 mm; is generally does not exceed 70 mm, or even 60 mm.

It follows from the foregoing that the present invention makes it possible to obtain one-piece cellular structures of infinite length or, rather, structures whose length can be varied up to infinity, and with a wide range of plastic-based compositions.

The cellular structures obtained by the process according to the invention are advantageously used in the building industry (lightweight ceilings, partitions, doors, concrete boxes, etc.), in furniture, in packaging (side protection, wrapping of objects, etc.), in motor vehicles (parcel shelf, door linings, etc.), in the aeronautical industry, etc.

As a general rule, these structures are particularly suitable for furniture and for buildings, for example for the construction of permanent shelters (habitations) or temporary shelters (rigid tents or humanitarian shelters for example).

When the plastic is a polyarylethersulphone, these structures are particularly suitable for aeronautical applications.

They may be used therein as such, or as sandwich panels, in which they are placed between two sheets called facings. The latter variant is advantageous, and in this case it is possible to manufacture said sandwich panel by welding, bonding, etc., or any other method of assembling the facings and the core (used cold or hot, just after extrusion) that is suitable for plastics. One advantageous way of manufacturing said sandwich panel consists in welding the facings to the cellular core.

Any welding process may be suitable for this purpose, processes using electromagnetic radiation giving goods results in the case or structures/facings that are at least partially transparent to the electromagnetic radiation. Such a process is described in Application FR 03/08843, the content of which is incorporated for this purpose by reference in the present application.

The process according to the invention is very suitable for obtaining honeycomb structures of large width that can be wound up on a drum in order to make coils thereof (for example a diameter of one meter) which, when unwound, give honeycomb sheets several hundred meters in length. For example, to make windable sheets four meters in width, the method of obtaining them is the following:

the starting point is a honeycomb structure having cells whose length L is higher than the width l (for example, L=2l). For this type of honeycomb structure, the rigidity in the machine direction is much higher than in the transverse direction, and therefore the cells can only be bent transversely;

a sheet 4 m in length is extruded;

this sheet is bonded or welded transversely via its lateral edge to the lateral edge of another sheet, and so on; and between each bonding/welding operation, the sheet thus obtained is wound up onto a roll with a minimum dimension of 4 m placed along the extrusion axis of the first strip. The bonding/welding is performed automatically by means of a robot.

However, if the width of the cell is larger than its length (l=2L), the honeycomb structure will be able to be wound up in the machine direction; it can therefore be extruded and wound directly, without bonding/welding, which is of course simpler. This feature can be obtained with the process forming the subject of the invention.

The wound honeycomb structures are useful in many industrial sectors, because of the possibility of:

producing linings as reinforcement;

unrolling carpet underlays for evening out floors; and unrolling continuous sheets for stabilizing soils, etc.

The present invention will be illustrated in a non-limiting manner by the following examples:

EXAMPLE 1

According to the Invention

A cellular structure 4 cm in width and 12 mm in height was extruded under the conditions and using the device that are described below:

SCAMEX 45 extruder provided with five separate heating zones (Z1 to Z5) and equipped with a die, as described above, equipped with glass-fibre-reinforced polyimide knives (on the front face of the die, not coated with insulating material), with stainless steel sizing units 18 mm in length, with a compressed air generator and with a vacuum pump, and having three heating zones heated to 200° C. The distance between the knives was 0.3 mm;

Temperature profile in the extruder:
  Z1: 115° C.
  Z2: 160° C.
  Z3: 185° C.
  Z4: 190° C.
  Z5: 195° C.

Composition: based on PVC, sold by Solvin under the name BENVIC® IR047;

Material temperature at the die inlet: 200° C.;

Extrusion pressure: 67.5 bar;

Screw speed: 7 rpm;

Compressed air pressure: 1.7 bar absolute;

Vacuum: 400 mmHg;

Duration of the pressure/vacuum cycles: 0.6 s/0.8 s; and

Draw ratio: 55%.

A cellular structure having the following properties was obtained:

Height: 12 mm; and

Bulk density: 0.143 kg/dm3.

EXAMPLE 2

According to the Invention

A cellular structure 4 cm in width and 10 mm in height was extruded under the conditions and using the device that are described below:

SCAMEX 45 extruder provided with five separate heating zones (Z1 to Z5) and equipped with a die, as described above, equipped with knives 17.4 PH steel, and stainless steel sizing units 18 mm in length, with a compressed air generator and with a vacuum pump, and having three heating zones heated to 185° C. The front face of the die is covered with a thermal insulation (glass-fibre-reinforced polyimide). The distance between the knives was 0.45 mm;

Temperature profile in the extruder:
  Z1: 110° C.
  Z2: 155° C.
  Z3: 185° C.
  Z4: 185° C.
  Z5: 185° C.

Composition: based on PVC, sold by Solvin under the name BENVIC® IR047;

Material temperature at the die inlet: 190° C.;

Extrusion pressure: 96 bar;

Screw speed: 9.5 rpm;

Compressed air pressure: 1.5 bar;

Vacuum: 400 mmHg;

Duration of the pressure/vacuum cycles: 0.6 s/0.6 s; and

Draw ratio: 70%.

A cellular structure having the following properties was obtained:

Height: 10 mm; and

Bulk density: 0.154 kg/dm$^3$.

EXAMPLE 3R

Comparative Example, Not According to the Invention

It was attempted to extrude a cellular structure 4 cm in width under the conditions and using the device that are described below:

SCAMEX 45 extruder provided with five separate heating zones (Z1 to Z5) and equipped with a die as described above, with metal knives and metal sizing units 18 mm in length—neither the front face of the knives, nor the front face of the die being covered with a thermal insulation—equipped with a compressed air generator and a vacuum pump, and having three heating zones heated to 200° C.;

Temperature profile in the extruder:
  Z1: 110° C.
  Z2: 155° C.
  Z3: 185° C.
  Z4: 185° C.
  Z5: 185° C.

Composition: based on PVC sold by Solvin under the name BENVIC® IR047;
Material temperature at the die inlet: 190° C.;
Extrusion pressure: 96 bar; and
Screw speed: 9.5 rpm.

As soon as the pressure/vacuum systems were turned on, the material solidified at the exit of the knives and no honeycomb structure could be produced.

EXAMPLE 4R

Comparative Example, Not According to the Invention

A cellular structure 4 cm in width and 10 mm in height was extruded under the conditions and using the device that are described below:
SCAMEX 45 extruder provided with five separate heating zones (Z1 to Z5) and equipped with a die, as described in document EP-B-1 009 625, having three heating zones heated to 210° C. The die emerged directly in the cooling water and was equipped with a water-based pressure/vacuum system for the welding, as described in Application FR 2 760 999;
Temperature profile in the extruder:
Z1: 111° C.
Z2: 158° C.
Z3: 194° C.
Z4: 194° C.
Z5: 204° C.
Composition: based on PVC, sold by Solvin under the name BENVIC® IR047;
Material temperature at the die inlet: 211° C.;
Extrusion pressure: 43 bar;
Screw speed: 13 rpm;
Water pressure: 1.5 bar;
Vacuum: 400 mmHg;
Duration of the pressure/vacuum cycles: 0.75 s/0.75 s;
Draw ratio: 60%; and
Temperature of the cooling water: 60° C.

A cellular structure having the following properties was obtained:
Height: 10 mm; and
Bulk density: 0.590 kg/dm$^3$.

The results of this example show that when water was used as cooling fluid, all other conditions being similar, the cellular structure obtained had a much higher bulk density. The objective of lightening the cellular structure and its corollary, namely the optimization of the mechanical properties/weight ratio of said structure, were therefore not achieved.

The invention claimed is:

1. A process for manufacturing a plastic-based cellular structure, in which:
parallel lamellae of a composition comprising at least one plastic are continuously extruded, in an approximately horizontal direction, through a die having a front face provided with a plurality of parallel slots and with an insulating material, at least on the surface; and
upon exiting the die, spaces lying between two adjacent lamellae are subjected, in successive alternations and between two sizing units whose length is short enough for the plastic composition to remain molten, to an injection of compressed gas and to a vacuum, the two sides of a given lamella being, in respect of one of them, subjected to the action of the compressed gas and, in respect of the other of them, subjected to the action of the vacuum, and vice versa during the next alternation, so as to deform the lamellae and weld them together in pairs, with formation, in a plane approximately parallel to the extrusion direction, of a cellular structure whose constituent cells extend perpendicular to the extrusion direction.

2. The process according to claim 1, wherein the plastic is chosen from: polyolefins, based on propylene or ethylene; polyarylethersulphones, such as polyphenylsulphones; polyamides; polyvinyl chlorides; thermoplastic fluoropolymers; and crosslinkable thermoplastic resins.

3. The process according to claim 1, wherein the composition has a viscosity measured according to ISO 6721-10, 1999, at the processing temperature and at 0.1 rad/s) of at least 2500 Pa·s.

4. The process according to claim 1, wherein compressed gas is air.

5. The process according to claim 1, wherein the cellular structure is subjected, just after its formation, to the action of a cooling fluid.

6. The process according to claim 1, wherein the plastic is a polyarylethersulphone.

7. A process for manufacturing a plastic-based cellular structure, in which:
parallel lamellae of a composition comprising polyvinyl chloride are continuously extruded, in an approximately horizontal direction, through a die having a front face provided with a plurality of parallel slots and with an insulating material, at least on the surface; and
upon exiting the die, spaces lying between two adjacent lamellae are subjected, in successive alternations and between two sizing units whose length is short enough for the plastic composition to remain molten, to an injection of compressed gas and to a vacuum, the two sides of a given lamella being, in respect of one of them, subjected to the action of the compressed gas and, in respect of the other of them, subjected to the action of the vacuum, and vice versa during the next alternation, so as to deform the lamellae and weld them together in pairs, with formation, in a plane approximately parallel to the extrusion direction, of a cellular structure whose constituent cells extend perpendicular to the extrusion direction.

* * * * *